United States Patent [19]

Moehr

[11] Patent Number: 4,630,944
[45] Date of Patent: Dec. 23, 1986

[54] GIB FOR MACHINE TOOL

[75] Inventor: Robert L. Moehr, Mt. Clemens,

[73] Assignee: The Cross Company, Fraser, Mich.

[21] Appl. No.: 757,156

[22] Filed: Jul. 22, 1985

[51] Int. Cl.⁴ .......................... F16C 33/02; F16C 29/12
[52] U.S. Cl. .......................................... 384/39; 384/40
[58] Field of Search ............ 308/3 R, 3 A, 6 R, 6 C;
409/343; 384/258, 261, 267

[56] References Cited

U.S. PATENT DOCUMENTS

| 1,771,857 | 7/1930 | Mesker et al. | 409/343 |
| 2,453,875 | 11/1948 | Terhune | 308/3 R |
| 3,401,991 | 9/1968 | MacDonnell | 308/3 R X |
| 3,601,455 | 8/1971 | Spieth | 308/3 R |
| 4,196,942 | 4/1980 | Calmes et al. | 308/3 R |
| 4,515,414 | 5/1985 | Werth | 308/3 R |
| 4,534,093 | 8/1985 | Jahnke et al. | 308/3 A X |
| 4,550,955 | 11/1985 | Grabher et al. | 308/6 C |

*Primary Examiner*—Stuart S. Levy
*Assistant Examiner*—Thomas R. Hannon
*Attorney, Agent, or Firm*—James O. Skarsten

[57] ABSTRACT

A gib (10) for a machine tool is insertable into a space between a machine tool carriage (42) and the positive way face (40) of a set of machine tool ways (44,96) supporting the carriage (42) for rectilinear movement. The gib (10) includes a body (12) having tapered ends (48) and a planar side surface (46) abutting the positive way face (40). The gib (12) further includes a fixed wedge (16) and a floating wedge (14), each of the wedges (14,16) having a crowned surface (50) in abutting relationship with one of the tapered ends (48) of the body (12), and having planar base surfaces (20,22) abutting a planar surface (38) of the carriage (42). An adjustment screw (28) traverses the body (12) and each of the wedges (14,16), and is rotatable to vary the spacing between the planar side surface (46) of the body (12) and the planar base surfaces (20,22) of the wedges (14,16). By selective adjustment of the spacing, compensation is made for wear-induced clearance between the carriage (42) and ways (44,96), to maintain the carriage (42) in accurate alignment with the ways (44,96), as it traverses the ways.

8 Claims, 6 Drawing Figures

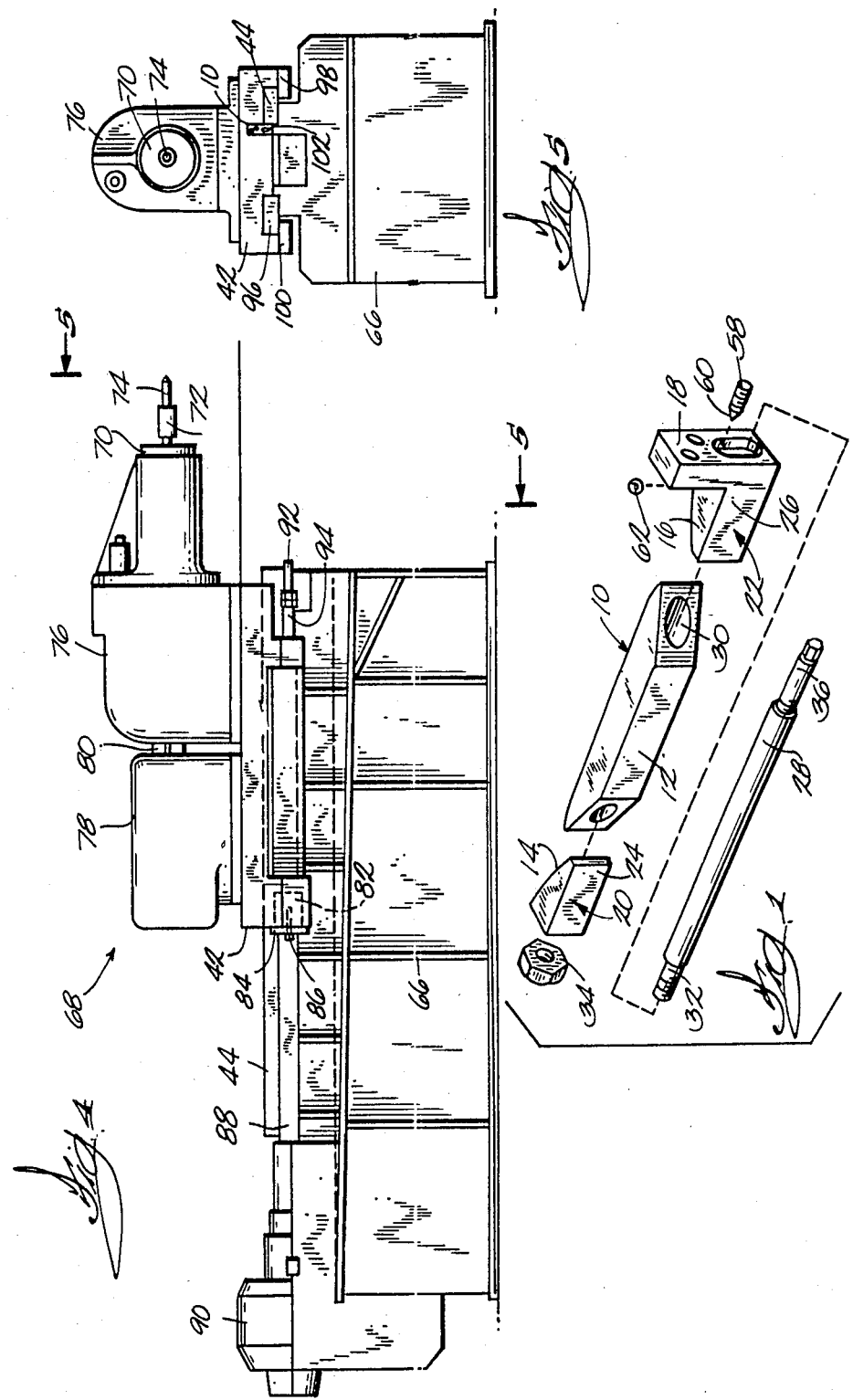

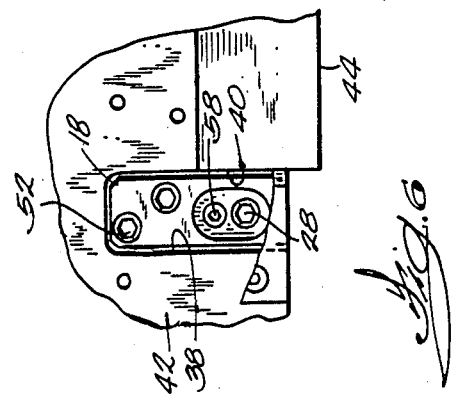
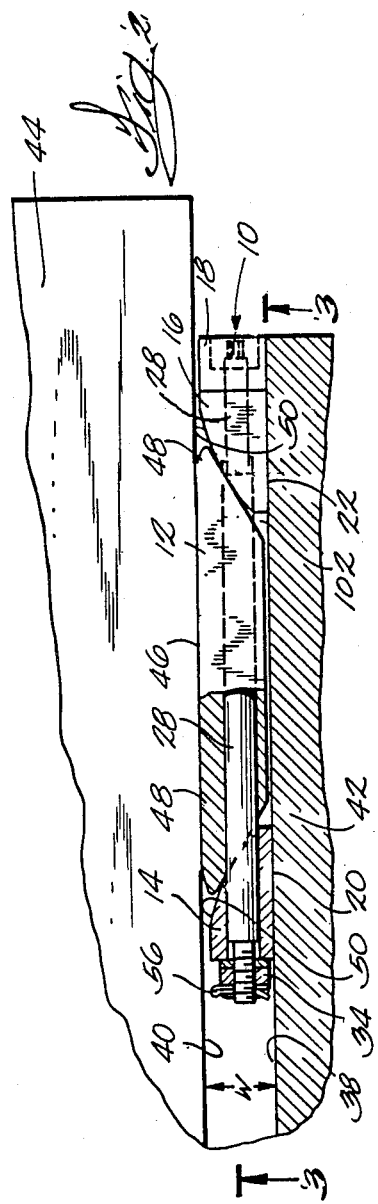
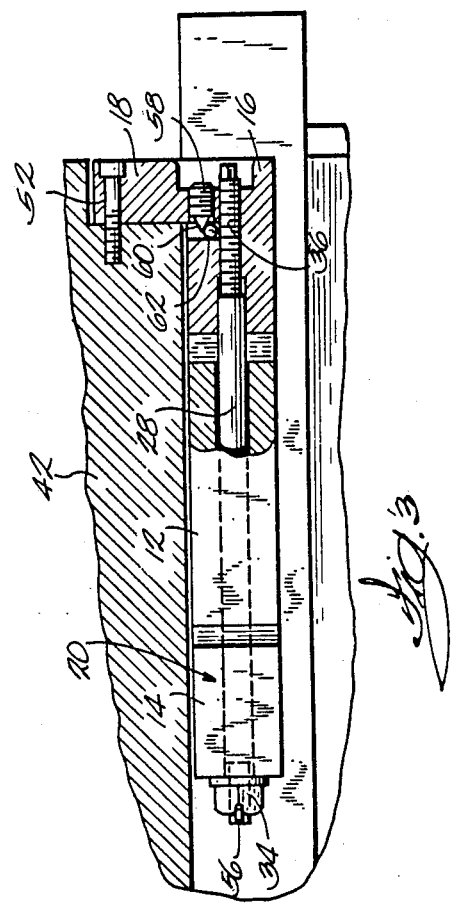

GIB FOR MACHINE TOOL

This invention pertains to a gib device for a machine tool which is used to prevent lateral movements of a carriage mounted upon a set of ways.

In an arrangement for rectilinearly moving a machine tool spindle, planar surfaces are formed along the lengths of parallel ways, which are rigidly supported and oriented along the axis of intended movement. Matching planar surfaces are formed along the underside of a carriage such that each surface formed in the carriage closely abuts one of the way surfaces when the carriage is mounted upon the ways for movement. Movement of the carriage is thus limited to rectilinear movement along the ways, and a spindle mounted upon the carriage moves therewith to machine workpieces with a high degree of precision.

In practice, a certain amount of wear occurs between abutting sides of the ways and the moving carriage. Over a period of time, the wear causes clearance to develop between the carriage and ways, allowing the carriage and spindle to move laterally with respect to the ways. To prevent loss of machining accuracy, it is necessary to provide some means for taking up the wear-induced clearance. Thus, it has become common practice to machine tapers at each end of a selected one of the planar surfaces formed along the underside of the carriage. When the carriage is placed upon the ways, the tapers in the machined surface and the abutting planar way surface, commonly referred to as the positive face of the positive way, define wedge-shaped spaces. The large ends of the spaces are open at the two opposing ends of the carriage, and the apexes of the wedges are pointed toward one another.

Typically, wedge-shaped gibs are inserted into the spaces, the gibs being attached to the carriage for movement therewith. The gibs are provided with adjustment screws which are selectively rotated to urge the gibs more deeply into their respective wedge-shaped spaces, or to back them out of the spaces. If one of the wedges is urged into its space while the other wedge is backed outward, the carriage will be forced to rotate slightly with respect to the ways. Thus, the gibs may be employed to manipulate the carriage to align the planar surfaces of the ways in strict parallel relationship with their respective matching planar surfaces formed in the carriage. If both gibs are urged into their respective spaces, any undesired clearance between the ways and carriage will be taken up by the gibs. The gibs will function to hold the carriage such that the parallel relationship between matching way and carriage surfaces will be maintained as the carriage moves along the ways.

A major disadvantage in conventional gibs of the above type lies in the need to machine the carriage in order to form the tapers required for effective use of the gibs. A significant cost is thereby added to the manufacture of the carriage. Also, conventional gibs may have more than one adjustment screw, complicating the adjustment of a gib inserted between a carriage and a positive way.

SUMMARY OF THE INVENTION

The invention pertains to a gib device which is insertable into a space provided between opposing planar surfaces of two members of a machine tool. The gib includes a body having tapered ends and a side surface abutting the planar surface of one of the members, and further includes first and second wedges, each having a crowned surface abutting one of the tapered ends and a base surface abutting the planar surface of the other member. The side surface of the body and base surfaces of the wedges are thus also in opposing relation. The gib is provided with means for moving the wedges in relation to the central body, as the tapered ends and crowned surfaces remain in contact, so that the side surface of the body is forced against one of the planar surfaces, and the base surfaces of the wedges are forced against the other planar surface. The separation between the two opposing planar surfaces is thus increased, by an amount related to the amount of movement between the body and wedges. The body and wedges are moved with respect to one another to establish a particular alignment between the two planar surfaces, such as a parallel alignment, whereupon means are actuated to prevent further movement between the body and wedges.

An advantage of the invention lies in reducing the machining which is required in the fabrication of a machine tool carriage.

Another advantage lies in providing gibs which have only a single point of adjustment, thereby reducing the time and effort required to adjust the gib to compensate for wear-induced clearance.

Another advantage lies in providing a gib for a machine tool which requires little or no machining in its manufacture, and which may be made by means of investment or precision casting.

DESCRIPTION OF THE PREFERRED EMBODIMENT

FIG. 1 is an exploded perspective view of an embodiment of the gib of the invention.

FIG. 2 is a top plan view showing the embodiment of FIG. 1 inserted into a space between a machine tool carriage and way.

FIG. 3 is a partial sectional view of the embodiment of FIG. 1 taken along lines 3—3 of FIG. 2.

FIG. 4 is a side elevational view showing a feed unit of a transfer machine employing the embodiment of FIG. 1.

FIG. 5 is an end elevational view as viewed from the plane of the lines 5—5 of FIG. 4.

FIG. 6 is a view showing a portion of FIG. 5 in greater detail and to an enlarged scale.

DETAILED DESCRIPTION OF THE PREFERRED EMBODIMENT

FIG. 1 shows gib (10) including a central body (12), a floating wedge (14) and a fixed wedge (16) having an integral bracket (18). Wedges (14) and (16) are provided with planar base surfaces (20) and (22) and with through-holes (24) and (26). An adjustment screw (28) is dimensioned so as to be insertable through the through-holes (24) and (26) and also through a through-hole (30) formed in the body (12). A set of threads (32) are formed in one end of the screw (28) for engaging a nut (34), and a set of threads (36) is formed in the opposite end of the screw (28) for engaging a matching set of threads formed around the periphery of the through-hole (26) in the fixed wedge (16).

FIG. 2 shows the gib (10) inserted between planar surfaces (38) and (40). The planar surface (38) is formed along the underside of a machine tool carriage (42) which is mounted for movement along a set of ways, as hereinafter described. The surface (38) is spaced slightly apart from the surface (40) which comprises the positive face of the positive way (44). The base surfaces (20) and (22) of wedges (14) and (16) abut the carriage surface (38) and form a portion of a side of the gib (10). The body (12) is provided with a planar surface (46) abutting the surface (40), the surface (46) comprising a portion of a side of gib (10) opposing the side of the gib which includes the wedge base surfaces (20) and (22). The body (12) is further provided with ends (48), which are symmetrically tapered at acute angles with planar surface (46). Curved or crowned surfaces (50) are formed in the wedges (14) and (16), each crowned surface (50) abutting one of the tapered ends (48) of the body (12).

FIG. 2 further shows the effective width "w" of the gib (10) to be equal to the spacing between planar surface (46) of the body (12) and the base surfaces (20) and (22) of the wedges (14) and (16). The through-holes (24), (26) and (30) are respectively formed in the body and wedges so that when they are respectively traversed by the adjustment screw (28), as shown in FIG. 2, the base surfaces (20) and (22) are in substantially co-planar relationship with the surface (46) of the body (12). However, the diameter of the through-hole (30) formed in the body (12) is made to be slightly greater than the diameter of the adjustment screw (28) to allow limited transverse movement of the body (12) relative to the screw (28). The difference between the diameters of the through-hole (30) and the screw (28) is selected in relation to an anticipated range of values to be taken by "w", which is varied by rotation of screw (28) as hereinafter described. In one useful application, the difference between the diameters of hole (30) and the adjustment screw (28) is on the order of 0.001".

FIG. 3 shows the gib (10) attached to carriage (42) by means of bolts (52) passing through the bracket (18). The floating wedge (14) and the body (12) are supported by means of screw (28), which is held by bracket (18) generally along an axis of intended movement of the carriage (42). The end of the screw (28) opposite the bracket (18) projects outwardly from the floating wedge (14), and the nut (34) is fixedly joined to such end by means of a cotter pin (56).

FIG. 3 further shows a locking screw (58), which is tightened after the width "w" of the gib (10) has been adjusted by rotation of the screw (28), to prevent further rotation of screw (28). The locking screw (58) is provided with a conical end (60). To lock the screw (28) against rotation, screw (58) is turned inwardly, whereupon the conical end (60) forces a ball (62) against screw (28).

FIG. 4 shows a feed unit for a transfer machine which usefully employs the gib (10). Feed unit has a side or wing base (66) rigidly supporting carriage (42) and a machining unit (68) mounted thereon for movement to the left or right, as viewed in FIG. 4. Parts (not shown) are positioned proximate to the right end of the feed unit (64) for machining by the machining unit (68). Machining unit (68) includes a spindle (70) for driving a toolholder (72) and associated tool (74) coupled to the spindle (70). The spindle in turn is rotatably driven according to conventional practice by a gear drive (not shown) contained in a gear housing (76). A motor (78) mounted on carriage (42) is drivingly connected by a shaft (80) to the spindle gear drive in the housing (76).

FIG. 4 further shows a running nut (82) having a flange (84) rigidly secured against rotation by means of bolts (86) which join the flange and nut (82) to carriage (42). Feed screw (88) drivingly engages the nut (82), and an end of the feed screw is joined to the output shaft (not shown) of a feed and traverse drive motor (90), for rotation in unison therewith. Thus, operation of the motor (90) results in rectilinear movement of the carriage (42) and machining unit (68). Typically, the motor (90) is operated to rapidly traverse the carriage (42) to the right, as viewed in FIG. 4, until the tool (74) is proximate to a part positioned for machining, and to then slowly feed the tool into the part. It is to be noted that travel of the carriage (42) and the unit (68) in the direction of a part is limited by a fixed stop (92) secured to the base (66) and a moving stop (94) secured to the carriage. As shown in FIG. 4, when the stops (92) and (94) are in abutting relationship, further movement to the right is prevented.

FIG. 5 shows carriage (42) mounted for movement upon ways (44) and (96), which are rigidly supported by wing base (66) in spaced-apart parallel relation. Keepers (98) are joined to carriage (42) and extend beneath the ways (44) and (96), according to conventional practice, to maintain the carriage and ways in sliding engagement. The gib (10) is inserted into a slot (102) formed along the underside of carriage (42). As shown in FIG. 6, one of the sides of the slot (102) comprises planar surface (38) of carriage (42), and the other side comprises the positive way face (40) of the way (44), the positive way of feed unit (64).

METHOD OF OPERATION

The feed unit (64) is constructed such that the axes of the spindle (72) and tool (74) must be aligned along ways (44) and (96) in order to perform accurate machining operations. If there is clearance between the carriage and ways, due to wear, the carriage is able to move laterally as it traverses the ways, allowing the spindle and tool axes to move out of the required alignment, Thus, to take up the clearance, the adjustment screw (28) is rotated to move rightward, as viewed in FIG. 2. The nut (34) is thereby urged toward the fixed wedge (16) along the slot (102), and thus acts to urge the floating wedge (14) toward the fixed wedge (16). As the wedge (14) is moved closer to the wedge (16), relative displacement occurs between the body (12) and the wedges (14) and (16) while the tapered ends (48) of the body (12) remain in contact with the crowned surfaces (50) of wedges (14) and (16). The relative displacement causes surface (46) of the body (12) to be urged against the positive way face (40), and the wedge base surfaces (20) and (22) to be urged against the planar carriage surface (38). The width "w" of gib (10) is thus increased. Since way (44) is fixed, the expansion of the gib (10) in slot (102) urges carriage (42) leftward as viewed in FIG. 2, until the carriage (42) is tightly held against the right sides of the ways (44) and (96). Movement of carriage (42) will thus be constrained to movement along the ways.

Usefully, a gib similar or identical to the gib (10) is inserted into the slot (102), at the end of the slot lying opposite from gib (10). By varying the width "w" of one or both gibs, by means of adjustment screws (28), carriage (42) may be moved with respect to the ways to position planar face (38) of the carriage (42) in parallel relation with positive way face (40).

I claim:

1. A gib for use with a machine tool having first and second members and means for moving the first member along a first axis with respect to the second member, the second member having a planar surface extending along the first axis and the first member having a planar surface in opposing relation with the planar surface of the second member, said gib comprising:

first and second wedges, each of said wedges having a crowned surface and a base surface, said base surfaces comprising at least a portion of a first side of said gib;

a body positioned between said wedges having tapered ends and a side surface, said side surface of said body comprising at least a portion of a second side of said gib, each of said tapered ends of said body abutting the crowned surface of one of said wedges;

means for mounting said body and said first and second wedges for movement with said first member and within a space between said planar surfaces of said first and second members; and means directed along a second axis passing through said wedges and said body for both moving and guiding movement of said body relative to said wedges to urge said side surface of said body against one of said planar surfaces of said first and second members and for urging said base surfaces of said wedges against the other of said planar surfaces of said first and second members to align said planar surface of said first member along said first axis as said first member moves with respect to said second member.

2. The gib of claim 1 wherein:
said moving and guiding means further comprises means for coupling said body to said wedges to maintain said body in contact with both of said wedges when said moving and guiding means causes said body to move relative to said wedges.

3. The gib of claim 1 wherein:
said moving and guiding means further comprises means for coupling said body to said wedges to maintain each of said tapered ends of said body in contact with the crowned surface of one of said wedges when said moving and guiding means causes said body to move relative to said wedges.

4. The gib of claim 1 wherein:
said body is provided with a passage extending between each of its tapered ends; and
said moving and guiding means comprises a screw extending through said passage of said body and connected to each of said wedges.

5. The gib of claim 4 wherein:
said passage comprises a hole formed through said body having a diameter selectively larger than the diameter of said screw.

6. The gib of claim 4 wherein:
said side surface of said body and said base surfaces of said wedges are planar surfaces.

7. The gib of claim 4 wherein:
said tapered ends of said body are tapered at acute angles to said side surface of said body.

8. The gib of claim 4 wherein:
said means for mounting said body and wedges within said space and for movement with said first member comprises a bracket integral with said first wedge and attached to said first member.

* * * * *